United States Patent
Bora et al.

(10) Patent No.: US 10,613,766 B1
(45) Date of Patent: Apr. 7, 2020

(54) DATA REPLICATION TECHNIQUES

(71) Applicant: EMC IP Holding Company LLC, Hopkinton, MA (US)

(72) Inventors: Bhaskar Bora, Shrewsbury, MA (US); Toufic Tannous, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/661,376

(22) Filed: Jul. 27, 2017

(51) Int. Cl.
*G06F 3/06* (2006.01)

(52) U.S. Cl.
CPC .......... *G06F 3/0613* (2013.01); *G06F 3/0659* (2013.01); *G06F 3/0683* (2013.01)

(58) Field of Classification Search
USPC ......................................................... 711/162
See application file for complete search history.

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 6,968,369 B2 | 11/2005 | Veprinsky et al. | |
| 7,054,883 B2 | 5/2006 | Meiri et al. | |
| 7,734,884 B1 | 6/2010 | Marshak et al. | |
| 7,752,404 B2 | 7/2010 | Cox et al. | |
| 7,779,291 B2 | 8/2010 | Yoder et al. | |
| 8,078,813 B2 | 12/2011 | LeCrone et al. | |
| 8,185,708 B2 | 5/2012 | LeCrone et al. | |
| 8,843,783 B2 | 9/2014 | Cox et al. | |
| 8,862,541 B1 | 10/2014 | Cox et al. | |
| 8,990,453 B1 | 3/2015 | Bora et al. | |
| 9,268,658 B2 | 2/2016 | Cox et al. | |
| 9,558,083 B2 | 1/2017 | LeCrone et al. | |
| 9,576,040 B1 | 2/2017 | Cox et al. | |
| 2009/0063786 A1* | 3/2009 | Oh | G06F 11/1068 711/148 |
| 2011/0040728 A1* | 2/2011 | Akirav | G06F 16/275 707/634 |
| 2017/0185306 A1* | 6/2017 | Eisler | G06F 3/0619 |

OTHER PUBLICATIONS

EMC (Electric Membership Corporation), EMC Symmetrix Remote Data Facility Product Guide, Mar. 2014 (Year: 2014).*
DELL EMC, "VMAX Non-Disruptive Migration: Configuration and Best Practices Technical Notes," May 2017.

\* cited by examiner

*Primary Examiner* — Charles Rones
*Assistant Examiner* — Jonah C Krieger
(74) *Attorney, Agent, or Firm* — Muirhead and Saturnelli, LLC

(57) ABSTRACT

Techniques for processing I/O operations may include: receiving, at a first data storage system from a host, a write operation that writes data to a logical device; sending the write operation in a synchronous manner to a plurality of other data storage systems, wherein the first data storage system and the plurality of other data storage systems form a linear chain over which the write operation is transmitted; and sending an acknowledgement to the host regarding completion of the write operation only after the first data storage system and each of the plurality of other data storage systems have acknowledged completion of the write operation.

15 Claims, 11 Drawing Sheets

DATA REPLICATION TECHNIQUES

BACKGROUND

Technical Field

This application generally relates to data storage and techniques for data replication.

Description of Related Art

Data storage systems may include resources used by one or more host systems. Data storage systems and host systems may be interconnected by one or more communication connections such as in a network. These resources may include, for example, data storage devices such as those included in the data storage systems manufactured by Dell Inc.. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of techniques herein is a method of processing I/O operations comprising: receiving, at a first data storage system from a host, a write operation that writes data to a logical device; sending the write operation in a synchronous manner to a plurality of other data storage systems, wherein the first data storage system and the plurality of other data storage systems form a linear chain over which the write operation is transmitted; and sending an acknowledgement to the host regarding completion of the write operation only after the first data storage system and each of the plurality of other data storage systems have acknowledged completion of the write operation. Each data storage system of the plurality of other data storage systems may acknowledge completion of the write operation to another data storage system of the linear chain that sent the write operation to said each data storage system. Each data storage system may acknowledge completion of the write operation after write data of the write operation is stored in a data cache of the data storage system. The plurality of other data storage systems may be two data storage systems. The method may include: sending the write operation from the first data storage system to a second of the plurality of other data storage systems; sending the write operation from the second data storage system to a third of the plurality of other data storage systems; receiving, at the second data storage system from the third data storage system, an acknowledgment regarding completion of the write operation; and responsive to receiving, at the second data storage system from the third data storage system, the acknowledgement regarding completion of the write operation, sending a second acknowledgement from the second data storage system to the first data storage system regarding completion of the write operation. The method may include: responsive to receiving, at the first data storage system from the second data storage system, the second acknowledgement regarding completion of the write operation, sending another acknowledgement to the host regarding completion of the write operation. The write operation may write data to the logical device having its data migrated from a source data storage system to a target data storage system, wherein the first data storage system may be the target data storage system, the source data storage system may be the second data storage system, and the third data storage system may be a disaster recovery site of the source data storage system. The first data storage system may include a first storage device and the second data storage system may include a second storage device, wherein the first storage device and the second storage device may be configured as the logical device. The third data storage system may include a third storage device configured as the logical device. The write operation may write data to a logical device having its data migrated from a source data storage system to a target data storage system, wherein the first data storage system may be the source data storage system, the target data storage system may be the second data storage system, and the third data storage system may be a disaster recovery site of the target data storage system. The first data storage system may include a first storage device and the second data storage system may include a second storage device, wherein the first storage device and the second storage device may be configured as the logical device. The third data storage system may include a third storage device configured as the logical device. The first data storage system may include a first storage device and the second data storage system may include a second storage device. The the first storage device and the second storage device may be configured as a same logical device. The write operation may write data to the same logical device. The host may be configured to write data to the same logical device over a plurality of paths including a first path and a second path, wherein the first path may be between the host and the first data storage system and the second path may be between the host and the second data storage system. Data of the same logical device may be migrated from a source data storage system to a target data storage system, and wherein the source data storage system may be one of the first data storage system and the second data storage system, and wherein the target data storage system may be the other of the first data storage system and the second data storage system. All writes to the same logical device received at the target data storage system may be synchronously replicated to the source data storage system, and wherein all writes to the same logical device received at the source data storage system may be synchronously replicated to the target data storage system.

In accordance with another aspect of techniques herein is a system comprising: a first data storage system having a first device; a second data storage system having a second device, wherein the first device and the second device are configured as the same logical device; a host configured to send I/O operations to the same logical device over at least a first path between the host and the first data storage system and a second path between the host and the second data storage system, wherein writes to the same logical device received at the first data storage system are synchronously transferred to the second data storage system and writes to the same logical device received at the second data storage system are synchronously transferred to the first data storage system; a third data storage system having a third device configured as the same logical device, wherein writes to the same logical device received at the first data storage system are synchronously transferred from the first data storage system to the third data storage system; a fourth data storage system having a fourth device configured as the same logical device, wherein writes to the same logical device received by the second data storage system are synchronously transferred from the second data storage system to the fourth data storage system; and a first memory of the first data storage system comprising code stored thereon that, when executed, performs first processing comprising: receiving, at the first data storage system on the first path from the host, a first write operation to the same logical device; sending the first write operation in a synchronous manner to the second data storage system and the third data storage system; receiving a first acknowledgement from the second data storage system and a second acknowledgement from the third data storage system regarding completion of the write operation; responsive to receiving the first acknowledgement and the second acknowledgement, sending a third acknowledgement to the host regarding completion of the first write operation; a second memory of the second data storage system comprising code stored thereon that, when executed, performs second processing comprising: receiving the first write operation from the first data storage system; sending the first write operation in a synchronous manner to the fourth data storage system; receiving, at the second data storage system, a fourth acknowledgement from the fourth data storage system regarding completion of the first write operation; and responsive to receiving the fourth acknowledgement, sending the second acknowledgement from the second data storage system to the first data storage system. The second memory of the second data storage system may further comprise code stored thereon that, when executed, performs first other processing comprising: receiving, at the second data storage system on the second path from the host, a second write operation to the same logical device; sending the second write operation in a synchronous manner from the second data storage system to the first data storage system and the fourth data storage system; receiving a fifth acknowledgement from the first data storage system and a sixth acknowledgement from the fourth data storage system regarding completion of the write operation; responsive to receiving the fifth acknowledgement and the sixth acknowledgement, sending a seventh acknowledgement to the host regarding completion of the second write operation; and wherein the first memory of the first data storage system further comprises code thereon that, when executed, performs second other processing comprising: receiving the second write operation from the second data storage system; sending the second write operation in a synchronous manner to the third data storage system; receiving, at the first data storage system, an eighth acknowledgement from the third data storage system regarding completion of the second write operation; responsive to receiving the eighth acknowledgement, sending the fifth acknowledgement from the first data storage system to the second data storage system. A first device pair of the first device and the second device may be configured for synchronous replication of writes from the first device to the second device. A second device pair of the second device and the first device may be configured for synchronous replication of writes from the second device to the first device. A third device pair of the first device and the third device may be configured for synchronous replication of writes from the first device to the third device. A fourth device pair of the second device and the fourth device may be configured for synchronous replication from the second device to the fourth device. A replication facility may perform processing including: sending the first write operation in a synchronous manner from the first data storage system to the second data storage system in accordance with the first device pair; sending the first write operation in a synchronous manner from the first data storage system to the third data storage system in accordance with the third device pair; sending the first write operation in a synchronous manner from the second data storage system to the fourth data storage system in accordance with the fourth device pair; sending the second write operation in a synchronous manner from the second data storage system to the first data storage system in accordance with the second device pair; sending the second write operation in a synchronous manner from the second data storage system to the fourth data storage system in accordance with the fourth device pair; sending the second write operation in a synchronous manner from the first data storage system to the third data storage system in accordance with the third device pair; and sending a plurality of acknowledgements including the first acknowledgment, the second acknowledgement, the fourth acknowledgement, the fifth acknowledgement and the sixth acknowledgement.

In accordance with another aspect of the techniques herein is a computer readable medium comprising code stored thereon that, when executed, performs a method of processing I/O operations comprising: receiving, at a first data storage system from a host, a write operation that writes data to a logical device; sending the write operation in a synchronous manner to a plurality of other data storage systems, wherein the first data storage system and the plurality of other data storage systems form a linear chain over which the write operation is transmitted; and sending an acknowledgement to the host regarding completion of the write operation only after the first data storage system and each of the plurality of other data storage systems have acknowledged completion of the write operation.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
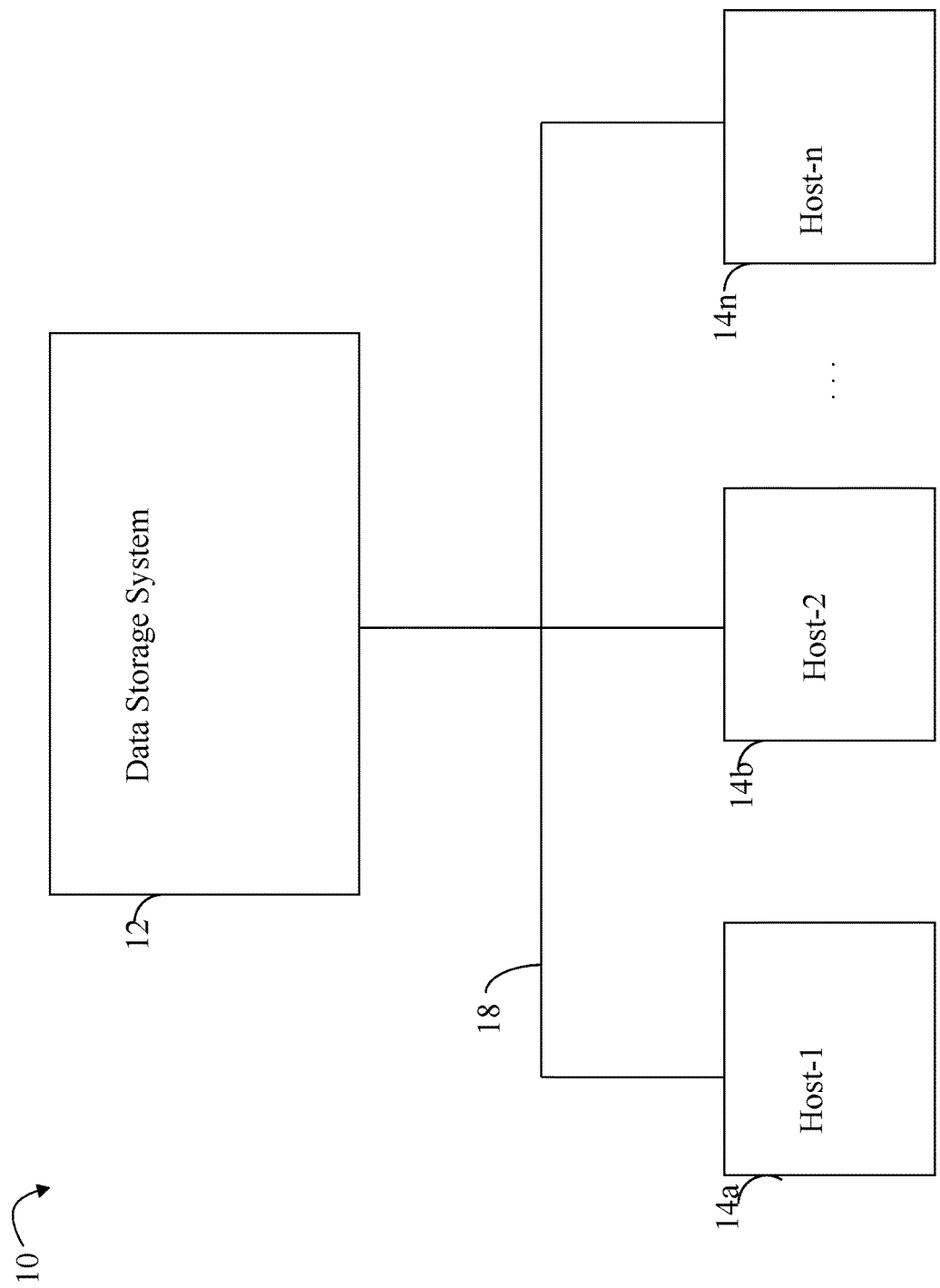
FIG. 1 is an example of an embodiment of components that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, Infiniband (IB), as well as, more generally, any suitable file-based protocol or block-based protocol. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as Dell's Symmetrix® VMAX® data storage system, as well one or more other data storage systems as may vary with the embodiment.

Figure 2A:
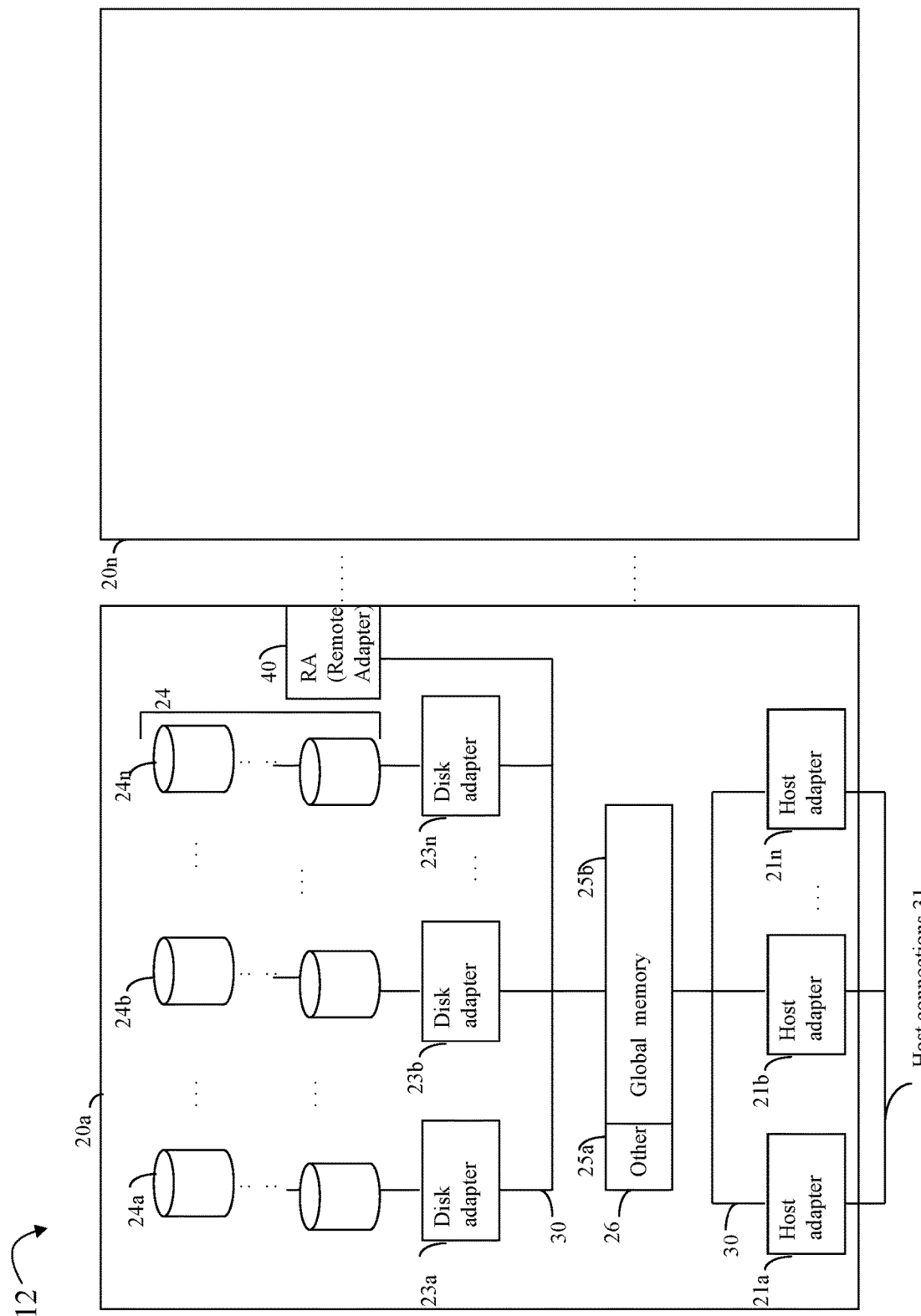
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system, a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices providing the backend physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two data storage systems.

The system 20a may also include one or more host adapters ("HAs") or directors 21a-21n. Each of these HAs may be used to manage communications and data operations between one or more host systems and the global memory 25b. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems such as by Dell Inc., various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate.

It should also be noted that a DA may also be a controller providing access to external physical drives or storage devices located on one or more external data storage systems rather than local physical drives located in the same physical storage system as the DA (such as illustrated in FIG. 2A).

Figure 2B:
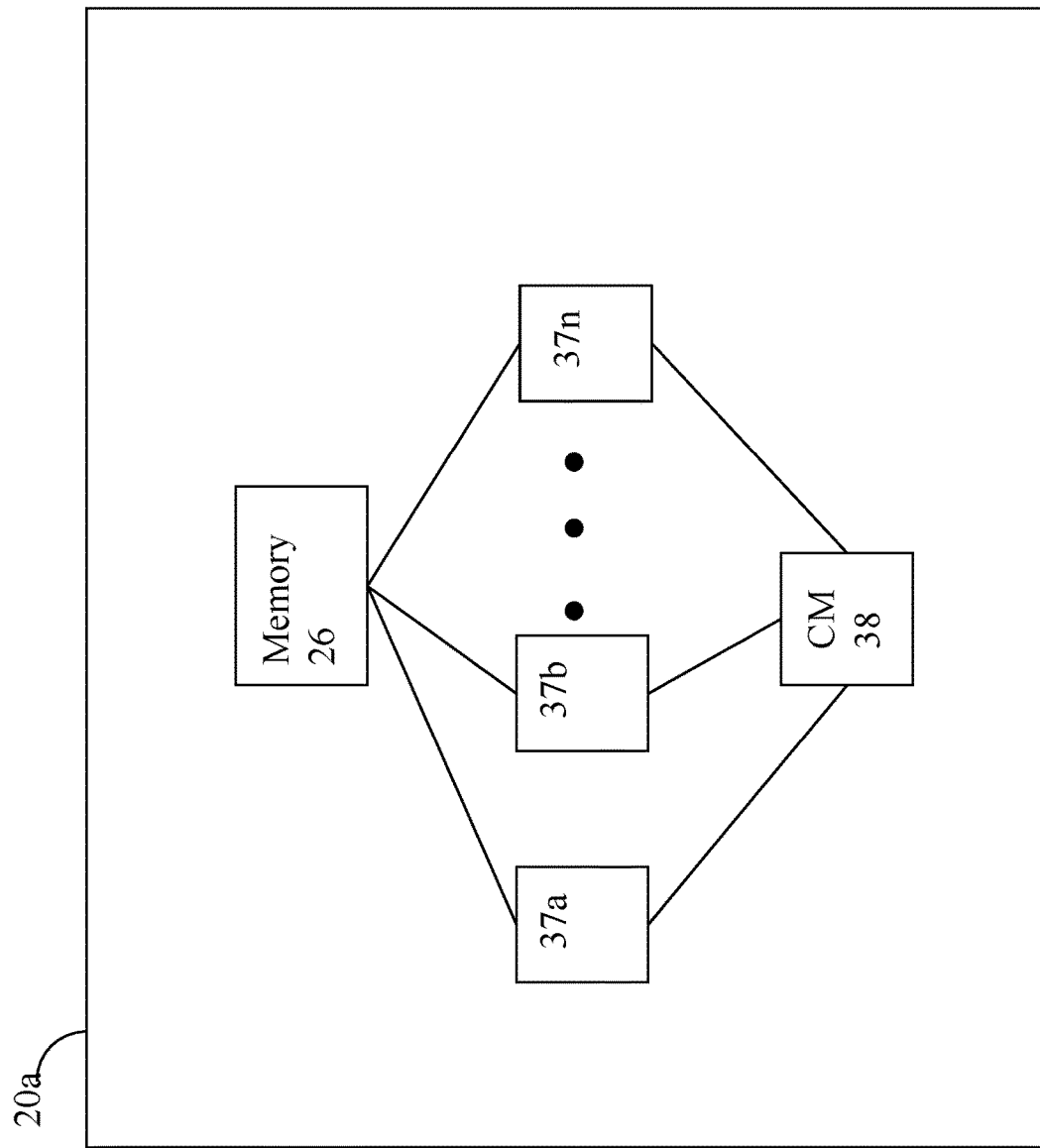
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

With reference back to FIG. 2A, illustrated is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over a Gigabit Ethernet or Fibre Channel transmission channel supporting messaging traffic between data storage systems. The RA may be hardware including a processor used to facilitate communication between data storage systems, such as between two Symmetrix® data storage systems. The RA may be used with the Symmetrix® Remote Data Facility (SRDF®) products provided by EMC Corporation of Hopkinton, Mass. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein.

Figure 3:
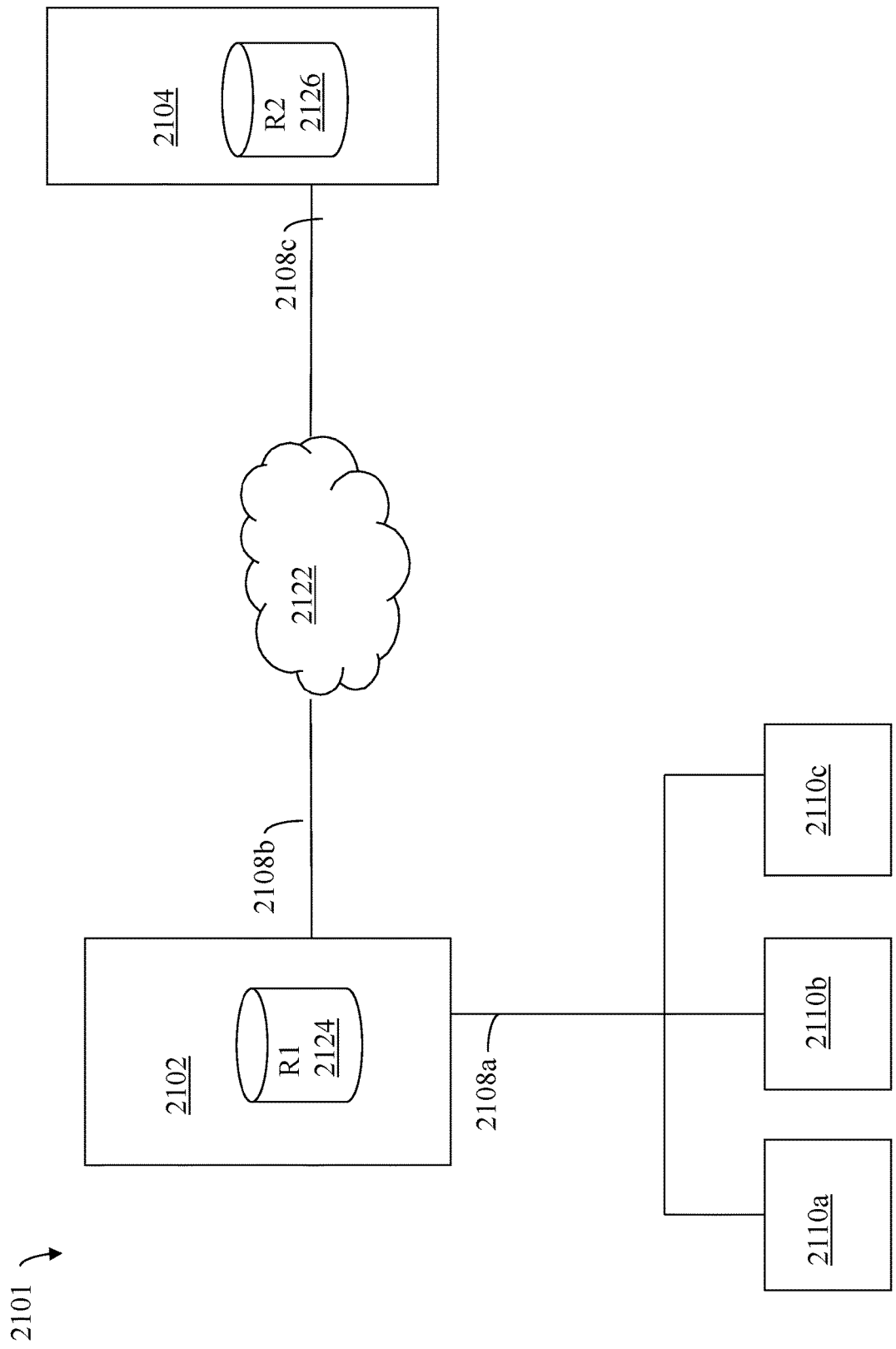
FIGS. 3, 4 and 5 are examples of various embodiments of components configured for replication.

Referring to FIG. 3, shown is an example of an embodiment of a system 2101 that may be used in connection with the techniques described herein. It should be noted that the embodiment illustrated in FIG. 3 presents a simplified view of some of the components illustrated in FIGS. 1 and 2A, for example, including only some detail of the data storage systems 12 for the sake of illustration.

Included in the system 2101 are data storage systems 2102 and 2104 and hosts 2110a, 2110b and 1210c. The data storage systems 2102, 2104 may be remotely connected and communicate over network 2122, such as the Internet or other private network, and facilitate communications with the components connected thereto. Hosts 2110a, 2110b and 2110c may perform operations to data storage system 2102 over connection 2108a. The hosts 2110a, 2110b and 2110c may be connected to the data storage system 2102 through connection 2108a which may be, for example, network or other type of communication connection. Although not illustrated, the hosts 2110a-2110c may also be directly connected to a network such as the Internet.

The data storage systems 2102 and 2104 may include one or more devices. In this example, data storage system 2102 includes storage device R1 2124 and data storage system 104 includes storage device R2 2126. Both of the data storage systems may include one or more other logical and/or physical devices. Data storage system 2102 may be characterized as local with respect to hosts 2110a, 2110b and 2110c. Data storage system 2104 may be characterized as remote with respect to hosts 2110a, 2110b and 2110c.

The host 1210a may issue a command, such as to write data to device R1 of data storage system 2102. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the SRDF® products provided by EMC Corporation of Hopkinton, Mass. Data storage device communication between Symmetrix® data storage systems using SRDF® is described, for example, in U.S. Pat. Nos. 5,742,792, 5,544,347, and 7,054,883, all of which are incorporated by reference herein. With SRDF®, a user may denote a first storage device, such as R1, as a master storage device and a second storage device, such as R2, as a slave storage device. Other incarnations of SRDF® may provide a peer to peer relationship between the local and remote storage devices. In this example, the host 2110a interacts directly with the device R1 of data storage system 2102, but any data changes made are automatically provided to the R2 device of data storage system 2104 using SRDF®. In operation, the host 110a may read and write data using the R1 volume in 2102, and SRDF® may handle the automatic copying and updating of data from R1 to R2 in data storage system 2104.

As illustrated in connection with other figures herein, data storage system 2102 may have one or more RAs included therein to facilitate remote connections to the data storage system 2104. Communications between storage system 2102 and 2104 may be made over connections 2108b, 2108c to network 2122. Data storage system 2104 may include one or more RAs for use in receiving the communications from the data storage system 2102. The data storage systems may communicate, for example, over Gigabit Ethernet connections supporting TCP/IP traffic. The SRDF® replication functionality may be facilitated with the RAs provided at each of the data storage systems 2102 and 2104. Performing remote data communications using SRDF® over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein. In connection with SRDF®, a single RDF link or path may be between an RA of the system 2102 and an RA of the system 2104. As described in more detail below, techniques are described for use in transmitting data over an RDF link, such as I/O traffic including write data in connection with performing remote data replication over the RDF link between the systems 2102 and 2104.

An embodiment may also include the concept of a remote data facility (RDF) group in which one or more devices on a data storage system are associated with a particular group under the control of a single RA which services the devices included therein. Rather than have a single R1 device and a single R2 device, a grouping may be defined so that a source group of devices, such as on data storage system 2102, have corresponding target devices of a target group, such as devices on data storage system 2104. Devices in a source group may be mirrored in corresponding devices of a target group using SRDF® functionality.

Techniques herein may be used with SRDF®, or more generally any RDF, operating in one or more different supported modes. For example, such modes may include SRDF® operating in synchronous mode, asynchronous mode, or adaptive copy mode. For example, in connection with SRDF®, the host may issue a write to an R1 device in a first data storage system and the data change is propagated to the R2 device in a second data storage system. As discussed in U.S. Pat. No. 5,544,347, SRDF® can be operated in either a synchronous mode or an asynchronous mode. When operating in the synchronous mode, the host does not consider an operation specified by a command chain to be completed until the command chain has been committed to both the first and second data storage systems. Thus, in synchronous mode, the first or source storage system will not provide an indication to the host that the data operation is complete until the first storage system receives an acknowledgement from the second data storage system regarding the data for the R2 device. In contrast, in connection with the asynchronous mode, the host receives an acknowledgement from the first data storage system as soon as the information is committed to the first data storage system without waiting for an acknowledge from the second data storage system. With synchronous SRDF®, a host cannot proceed to the next I/O until a synchronous SRDF® I/O has completed.

Depending on the physical distance between the data storage systems 2102, 2104, it may be desirable to operate in a mode such as asynchronous to avoid host timeouts while the host awaits acknowledgement regarding completion of a host I/O.

Described in following paragraphs are techniques that may be used in connection with performing data replication in a synchronous manner such as SRDF® operating in an synchronous mode (SRDF®/S). With synchronous mode data replication, a host 2110a may issue a write to the R1 device 2124. The primary or R1 data storage system 2102 may store the write data in its cache at a cache location and mark the cache location as including write pending (WP) data as mentioned elsewhere herein. The remote data replication facility operating in synchronous mode, such as SRDF®/S, may propagate the write data across an established RDF link (more generally referred to as a the remote replication link or link) such as over 2108b, 2122, and 2108c, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. Responsive to receiving this acknowledgement from the R2 data storage system 2104, the R1 data storage system 2102 may return an acknowledgement to the host 2110a that the write has been received and completed. Thus, generally, R1 device 2124 and R2 device 2126 may be logical devices, such as LUNs, configured as mirrors of one another. R1 and R2 devices may be, for example, fully provisioned LUNs, such as thick LUNs, or may be LUNs that are thin or virtually provisioned logical devices.

Figure 4:
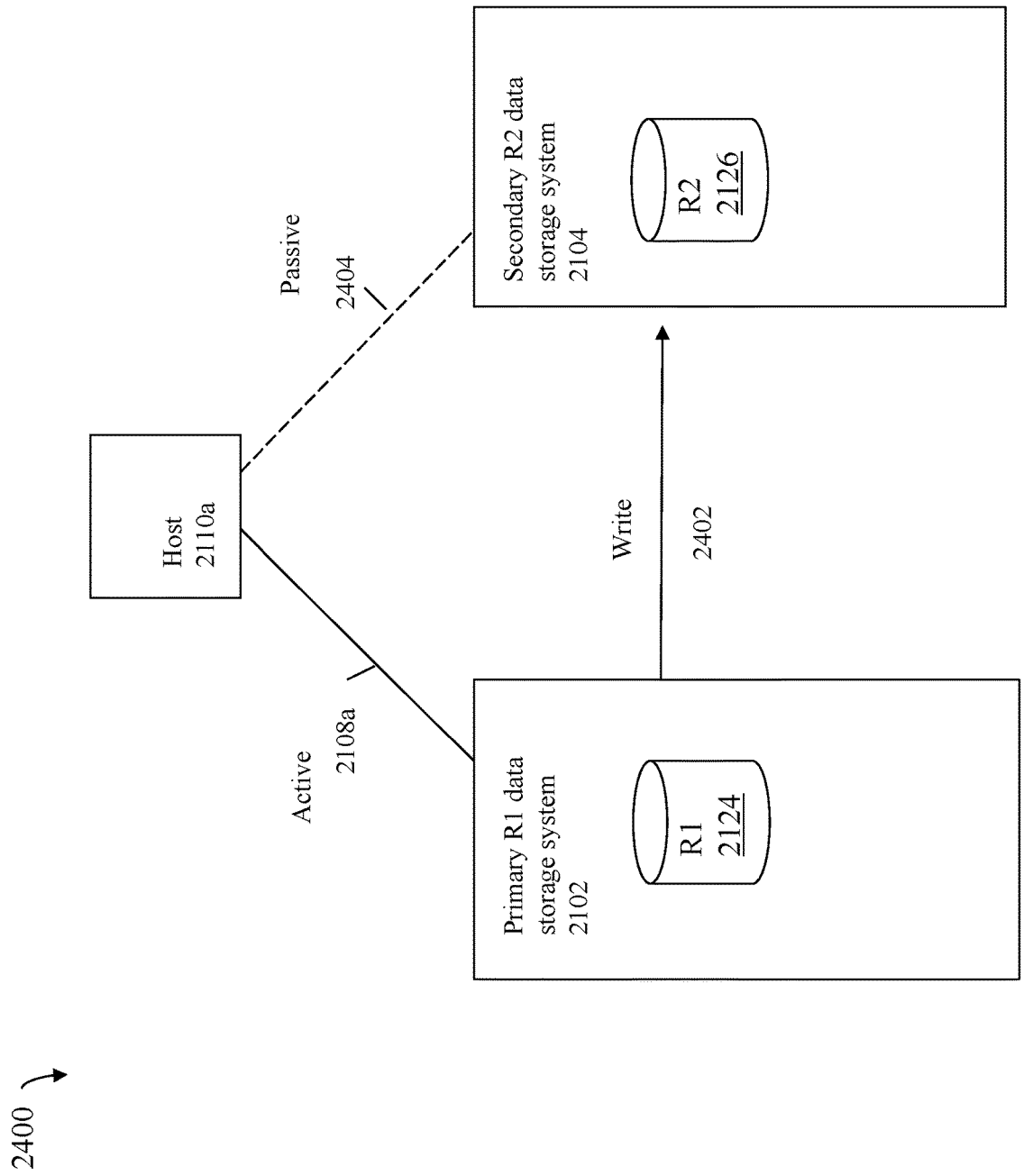

With reference to FIG. 4, shown is a further simplified illustration of components that may be used in an embodiment in accordance with techniques herein. The example 2400 is simplified illustration of components as described in connection with FIG. 2. Element 2402 generally represents the replication link used in connection with sending write data from the primary R1 data storage system 2102 to the secondary R2 data storage system 2104. Link 2402, more generally, may also be used in connection with other information and communications exchanged between 2101 2102 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 4 may also be referred to herein as an active-passive configuration used with synchronous replication where the host 2110a has an active connection or path 2108a over which all I/Os are issued to only the R1 data storage system. The host 2110a may have a passive connection or path 2404 to the R2 data storage system 2104. In the configuration of 2400, the R1 device 2124 and R2 device 2126 may be configured and identified as the same LUN, such as LUN A, to the host 2110a. Thus, the host 2110a may view 2108a and 2404 as two paths to the same LUN A where path 2108a is active (over which I/Os may be issued to LUN A) and where path 2404 is passive (over which no I/Os to the LUN A may be issued). Should the connection 2108a and/or the R1 data storage system 2102 experience a failure or disaster whereby access to R1 2124 configured as LUN A is unavailable, processing may be performed on the host 2110a to modify the state of path 2404 to active and commence issuing I/Os to the R2 device configured as LUN A. In this manner, the R2 device 2126 configured as LUN A may be used as a backup accessible to the host 2110a for servicing I/Os upon failure of the R1 device 2124 configured as LUN A.

Figure 5:
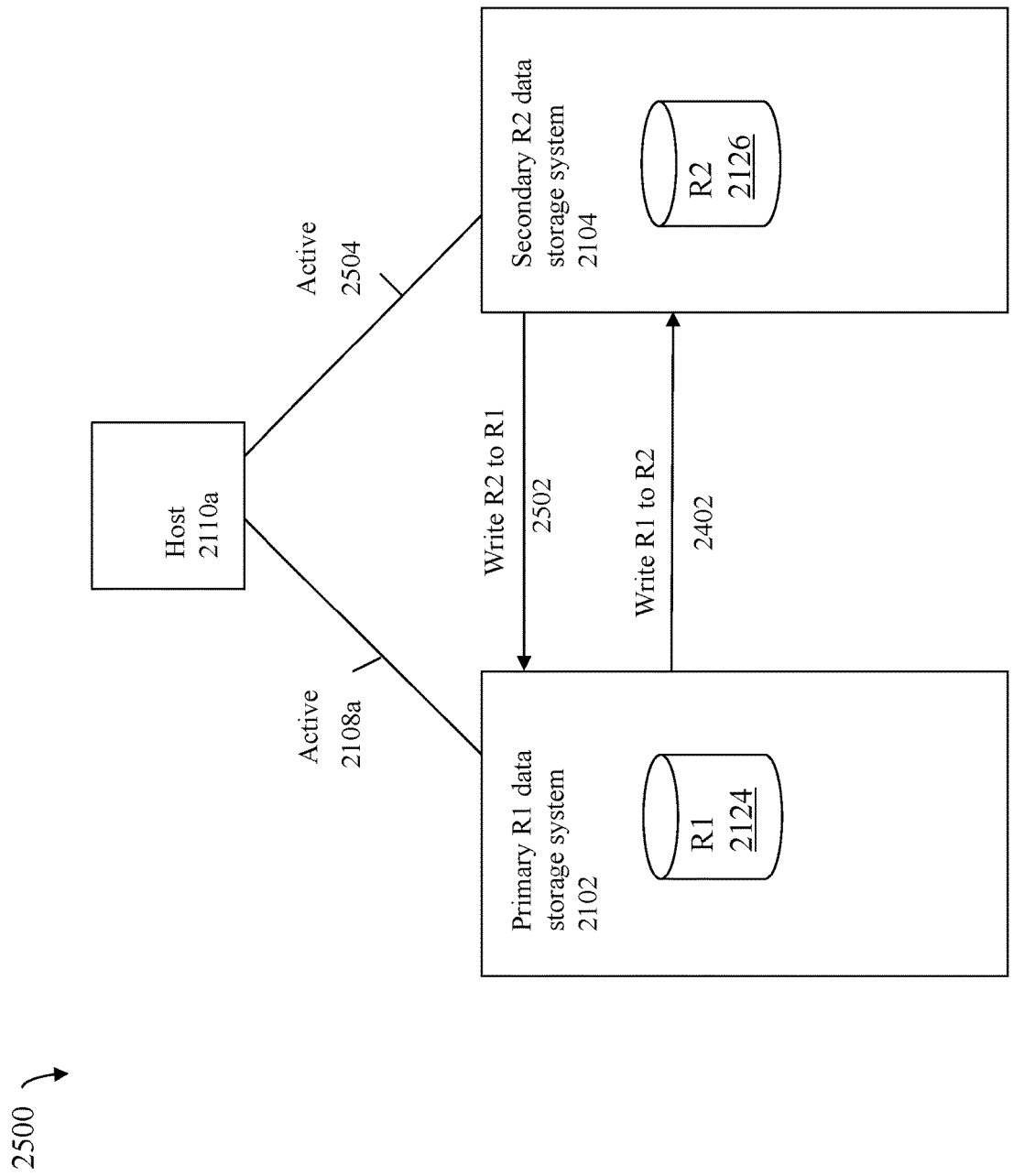

Referring to FIG. 5, shown is another example configuration of components that may be used in an embodiment in accordance with techniques herein. The example 2500 illustrates an active-active configuration in connection with synchronous replication. In an active-active configuration with synchronous replication, the host 2110a may have a first active path 2108a to the R1 data storage system and R1 device 2124 configured as LUN A. Additionally, the host 2110a may have a second active path 2504 to the R2 data storage system and R2 device 2126 configured as LUN A. From the view of the host 2110a, paths 2108a and 2504 appear as 2 paths to the same LUN A as described in connection with FIG. 4 with the difference that the host in the example 2500 configuration may issue I/Os, both reads and/or writes, over both of paths 2108a and 2504. The host 2110a may send a first write over path 2108a which is received by the R1 system 2102 and written to cache of the R1 system 2102 where, at a later point in time, the first write is destaged from the cache of the R1 system 2102 to physical storage provisioned for the R1 device 2124 configured as LUN A. The R1 system 2102 also sends the first write to the R2 system 2104 over link 2402 where the first write is written to cache of the R2 system 2104, where, at a later point in time, the first write is destaged from the cache of the R2 system 2104 to physical storage provisioned for the R2 device 2126 configured as LUN A. Once the first write is written to the cache of the R2 system 2104, the R2 system 2104 sends an acknowledgement over link 2402 to the R1 system 2102 that it has completed the first write. The R1 system 2102 then returns an acknowledgement to host 2110a over path 2108a that the first write has completed.

The host 2110a may also send a second write over path 2504 which is received by the R2 system 2104 and written to cache of the R2 system 2104 where, at a later point in time, the second write is destaged from the cache of the R2 system 2104 to physical storage provisioned for the R2 device 2126 configured as LUN A. The R2 system 2104 also sends the second write to the R1 system 2102 over a second link 2502 where the second write is written to cache of the R1 system 2102, and where, at a later point in time, the second write is destaged from the cache of the R1 system 2102 to physical storage provisioned for the R1 device 2124 configured as LUN A. Once the second write is written to the cache of the R1 system 2102, the R1 system 2102 sends an acknowledgement over link 2502 to the R2 system 2104 that it has completed the second write. The R2 system 2104 then returns an acknowledgement to host 2110a over path 2504 that the second write has completed.

Thus, in the example 2500, the illustrated active-active configuration includes a first RDF R1-R2 device pairing configured for synchronous replication (from 2102 to 2104) where the R1 device is 2124 and the R2 device is 2126 whereby writes to LUN A sent over 2108a to system 2102 are stored on the R1 device 2124 and also transmitted to system 2104 over 2402. The write sent over 2402 to system 2104 is stored on the R2 device 2126. Such replication is performed synchronously in that the acknowledgement to the host write sent over 2108a is not acknowledged as successfully completed unless and until the write data has been stored in caches of systems 2102 and 2104.

In a similar manner, the illustrated active-active configuration of the example 2500 includes a second RDF R1-R2 device pairing configured for synchronous replication (from 2104 to 2102) where the R1 device is 2126 and the R2 device is 2124 whereby writes to LUN A sent over 2504 to system 2104 are stored on the device 2126 (now acting as the R1 device of the second RDF device pairing) and also transmitted to system 2102 over connection 2502. The write sent over 2502 is stored on the R2 device 2124. Such replication is performed synchronously in that the acknowledgement to the host write sent over 2504 is not acknowledged as successfully completed unless and until the write data has been stored in caches of systems 2102 and 2104.

Effectively, using the second RDF device pairing in the active-active configuration with synchronous replication as in FIG. 5 has the R2 system 2104 act as another primary data storage system which facilitates propagation of writes received at the data storage system 2104 to the data storage system 2102. It should be noted that although FIG. 5 illustrates for simplicity a single host accessing both the R1 device 2124 and R2 device 2126, any number of hosts may access one or both of the R1 device 2124 and the R2 device 2126.

At least one application that may be used in connection with an arrangement as illustrated in FIG. 5 is data migration. For example, in at least one embodiment, the R1 data storage system 2102 may be a source data storage system and the R2 data storage system 2104 may be a target data storage system (e.g. source 2102 referring to migration data source and target 2104 referring to migration data target). In such an embodiment the system 2104 may be a new data storage system that will replace system 2102 once all data from 2102 has been migrated to 2104. The data migration application may be migrating data of LUN A as stored on source R1 device 2124 to target R2 device 2126. During various points in time or phases of the migration process, the states of paths 2108a and/or 2504 may change from active to passive, passive to active, and possibly other states depending on the migration application. During various NDM phases, as well as before and after the NDM has completed, the paths 2108a, 2504 may both be active, path 2108a may be active with path 2504 passive, or path 2108a may be passive with path 2504 active.

For example, in at least one embodiment, the data migration application may perform a non-disruptive migration (NDM) whereby the data is migrated while the source data storage system 2102 is up and running and while the host 2110a is able to issue writes to LUN A during the active migration process. However, while the migration is ongoing, which may take days or even longer, it may be necessary to have an additional disaster recovery site for at least the source system 2102. It may also be desirable and/or necessary to have an additional disaster recover site for the target system 2104. Generally, during the NDM as well as for other applications, it may be necessary and/or desirable to have additional disaster recovery sites for any one of, or both of, systems 2102 and 2104. Each such disaster recovery (DR) site may be another data storage system connected to one of the systems 2102, 2104 further storing another copy of LUN A's data. Furthermore, it may be necessary and/or desirable to have the additional copy of LUN A data stored on the DR site be maintained in a synchronous manner (e.g., synchronous data transfer) with respect to a first copy of LUN A data as stored on 2102, 2104. For example, in at least one embodiment in connection with performing NDM as noted above, due to regulatory and other disaster recover requirements, a data storage customer may be required to maintain another synchronous copy of R1 2124 for at least the source system 2102 at a third data storage system serving as the DR site for the source system 2102.

Figure 6:
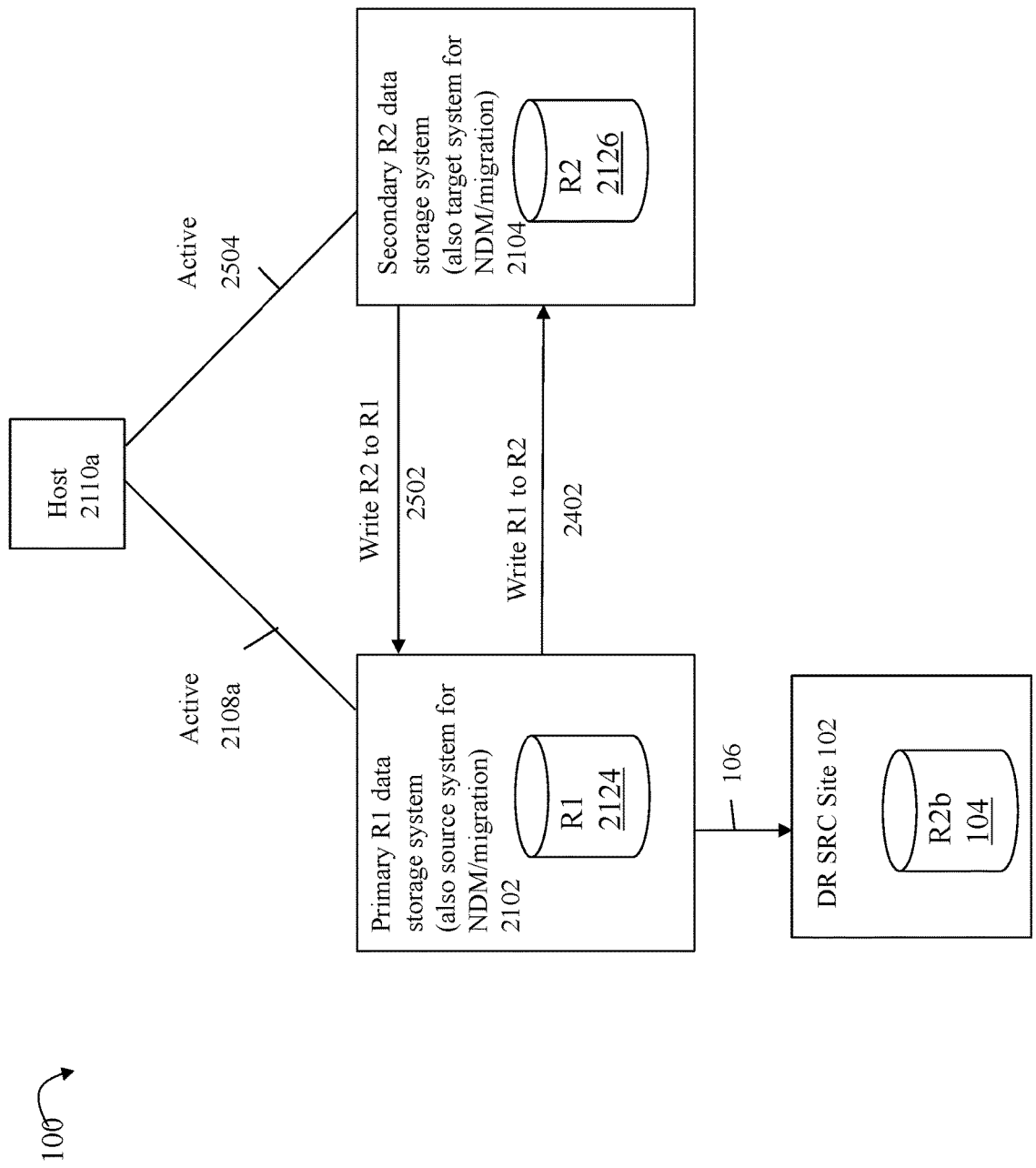
FIGS. 6, 7, and 8 are examples of various embodiments of components configured for use with techniques herein.

Referring to FIG. 6, shown is an example of a configuration and components that may be used in an embodiment in accordance with techniques herein. The example 100 includes components configured as described in connection with FIG. 5 with the addition of DR SRC site or data storage system 102, device R2b and connection or link 106. In the example 100, there may be a third configured R1-R2 RDF device pair of R1 2124 and R2b 104 configured for synchronous data replication whereby R2b 104 is maintained as a mirror of R1 2124 in a synchronous manner. Thus, R2b 104 may also be configured as the same LUN, LUN A, as devices 2124 and 2126. Writes to R1 2124 are transferred over connection or link 106 to R2b 104. The DR SRC site 102 serves as a DR site for system 2102.

Consistent with discussion elsewhere herein, a first write to LUN A may be sent over path 2108a to system 2102. The write data may be stored in cache on 2102 and marked as WP to be subsequently destaged or written out to physical storage provisioned for R1 2124 at a later point in time. Additionally, the first write may be sent to both data storage systems 2104 and also 102. The first write may be sent by system 2102 over 106 to DR SRC site 102 where the write data is stored in data cache of system 102. Once the first write data is stored in cache of the system 102, the system 102 returns a first acknowledgement regarding completion (successful completion) of the first write to system 2102. In a similar manner, the first write may be sent by system 2102 over connection 2402 to system 2014. Once the first write data is stored in cache of the system 2104, the system 2104 returns a second acknowledgement regarding completion of the write to system 2102. Once the system 2102 receives both the above-noted first and second acknowledgements regarding completion of the write operation, respectively, by systems 102 and 2104, the system 2102 may then return an acknowledgement to the host regarding successful completion of the host's first write operation. In this manner, the additional copy of LUN A data maintained on R2b 104 on DR SRC site 102 may be maintained using synchronous replication techniques as described herein. In the example 100, a first RDF device pair R1 2124-R2 2126 may be configured for synchronous replication mode as described above. Additionally, the third RDF device pair R1 2124-R2b 104 may be configured for synchronous replication mode where devices 2124, 2126 and 104 may also be configured as devices including copies of LUN A data (e.g., 2124, 2126, 104 may be configured as the same logical device LUN A).

Consistent with discussion elsewhere herein, a second write to LUN A may be sent over path 2504 to system 2104. The second write data may be stored in cache on 2104 (whereby the write data is subsequently written out to physical storage provisioned for R2 2126 at a later point in time). The second write may be sent to both data storage systems 2102 and also 102. In connection with this second write, systems 2104, 2102 and 102 may be characterized in one aspect as forming a series of data storage systems in a linear chain where the second write is sent to each data storage system in this chain. Additionally, the linear chain of storage systems 2104, 2102 and 102 providing for synchronous replication of the second write is formed from the second configured RDF device pair noted above (whereby the R1 device is 2126 and the R2 is 2124) and the third configured RDF device pair noted above (whereby the R1 device is 2124 and R2 device is 104). Based on the second configured RDF device pair (2126, 2124), the second write may be sent by system 2104 over connection 2502 to system 2102 where the write data is stored in data cache of system 2102. Based on the third configured RDF device pair (2124, 104), the second write may be further cascaded and passed to the next system 102 in the chain. In particular, the second write may be sent from system 2102 over connection 106 to DR SRC site 102. Once the write data is stored in cache of the system 102, the system 102 returns a first acknowledgement regarding completion (successful completion) of the write to system 2102. Once the system 2102 receives the first acknowledgement, the system 102 may return a second acknowledgement regarding completion of the write to system 2104. Once the system 2104 receives the second acknowledgement regarding completion of the write operation from system 2102, the system 2104 may then return an third acknowledgement to the host (over path 2504) regarding successful completion of the host's second write operation. In this manner, the additional copy of LUN A data maintained on R2b 104 on DR SRC site 102 may be maintained using synchronous replication techniques as described herein. In connection with the second write, the third acknowledgement regarding completion of the second write is not sent to the host unless and until the system 2104 receives the above-noted second acknowledgement from the system 2102. In this manner, the host 2110a does not receive an acknowledgement regarding completion of the second write unless and until all 3 data storage systems 2104, 2102, 102 in the chain complete the write operation, such as by storing the write data in their respective data caches. In at least one embodiment using data caching as employed by data storage systems described herein, completion of the write operation by a receiving system may be acknowledged to a sender (system that transmits the write to the receiving system) as complete once the write data has been stored in cache. A failure regarding the write may result if there is failure regarding data transmission or acknowledgement for any portion of the chain (e.g., between any 2 systems of the chain or failure to store the write data on any system of the chain).

Thus, in connection with the second write processing as just described, acknowledgement regarding completion of the second write is not sent until the write has been sent synchronously to system 2102 and also to the DR SRC Site 102.

In at least one embodiment using techniques herein with NDM, the components of the embodiment may be initially configured in a pass through mode. In pass through mode, the system may be configured as just described above and illustrated in the example 100 with some additional differences. In pass through mode, writes (such as the above-noted first write) received by the source system 2102 may be processed as described above. However, any write (such as the above-noted second write) sent directly to the target system 2104 (e.g., by host 2110a over 2504) may be simply transferred to the source system 2102 and not committed or stored locally on target system 2104. Thus, as a variation to the above description, when in pass through mode the second write from host 2110a sent over 2504 to system 2014 may not be stored in data cache of 2104 to be subsequently destaged from the data cache and stored on physical storage provisioned for storage device R2 2126. Rather, in pass thorough mode, the write data may be received by system 2104 which then passes the write data over 2502 to system 2102. The system 2102 may then store the write data in its data cache (to be subsequently stored at a later point in time on physical storage provisioned for device R1 2124). The system 2012 may also send the write data over 106 to system 102. The system 102 may then store the write data in its data cache (to be subsequently stored at a later point in time on physical storage provisioned for device R2b 104). Once system 102 stores the write data in its data cache, the system 102 may return a first acknowledgement to system 2102. Responsive to receiving the first acknowledgement from system 102, the system 2102 may then return a second acknowledgement to system 2104. Responsive to receiving the second acknowledgment, the system 2104 may then return an acknowledgement to the host regarding completion of the second write. Thus, the acknowledgement returned from a first system to a system may generally denote acknowledgement that the first system has successfully completed a required transfer (if any) of write data to the second system (and received subsequent acknowledgement from the second system regarding the transfer) and also that the first system (if required) has locally stored or committed the write data. Consistent with the above described pass through mode, the system 2104 does not store the write data locally but system 2104 transmits the write data to the system 2102 and receives an acknowledgement from system 2102. The system 2104 returns an acknowledgement to the host regarding completion of the write operation responsive to receiving the acknowledgement from system 2102. The system 2102 returns an acknowledgement to system 2104 upon completion of successfully storing the write data in its data cache, transmitting the write data to the system 102, and receiving an acknowledgement from system 102. The system 102 sends an acknowledgement to system 2102 once it has stored the write data in its data cache.

In at least one embodiment of NDM using the pass through mode as described above in connection with FIG. 6, writes from host 2110a may thus be sent to the source data storage system 2102 in two ways—

1. where the write (such as the first write described above in connection with FIG. 6) is sent directly to system 2102 over active path 2108a; and 2. where the write is sent indirectly to system 2102 (such as the second write described above in connection with FIG. 6). In this case, the write is sent from host 2110a over active path 2504 to the target system 2104. The target system 2104 transfers the write to system 2102 over 2502. The system 2102 transfers the write to DR SRC site or system 102. System 102 performs its processing to store the write data in its local data cache and returns a first acknowledgement to system 2102. Responsive to receiving the first acknowledgement at system 2102 also locally storing the write data in data cache of system 2102, the system 2102 then returns a second acknowledgement to system 2104. Responsive to receiving the second acknowledgement, the system 2104 returns an acknowledgment to the host regarding successful completion of the host write operation. In this manner, where the write operation is transmitted between pairs of data storage systems forming the chain based on RDF device pairs configured for synchronous replication, the final acknowledgement to the host from system 2104 is returned only after each other data storage system in the linear chain has also returned its required acknowledgment to the data storage system that transmitted the write data to the other system.

In connection with the second write processing described above where the second write is sent from the host 2110a over 2504 to system 2104, the chain is described as including 3 data storage systems—2104, 2102, 102. However, more generally, the chain (as well as other linear chains of 3 data storage systems such as described herein in connection with FIGS. 6, 7 and 8) may include any suitable number of N data storage systems forming the linear chain, wherein N is at least 3. Even more generally, the various chains or linear chains (e.g., such as described in connection with FIGS. 6, 7 and 8 herein) each with 3 or more data storage systems may be used in connection with any suitable mode and configuration. In connection with the linear chain, the final acknowledgement to the host is returned only when each system in the chain has received the transmitted write, transmitted the write to any next system in the chain and received an acknowledgement from such next system, and stored or committed the write locally, if required. Each system in the chain (other than the original system that received the write) sends an acknowledgement up the chain (whereby the acknowledgment indicates that the system has received the transmitted write, transmitted the write to any next system in the chain and received an acknowledgement from such next system, and stored or committed the write locally, if required). Consistent with discussion herein, each pair of data storage systems in the chain may be configured to have a defined RDF device pair with synchronous replication with the R1 device in one of the systems of the pair and the R2 device in the other system of the pair.

In at least one embodiment of NDM, the mode or state may change from the foregoing pass through mode whereby the pass through mode may be an initial state established prior to the migration. At a later point in time, the NDM data migration of LUN A data from R1 2124 to R2 2126 commences whereby the NDM mode or state may transition to a "migrating state" (during the migration or while the data is being migrated from 2124 to 2126). In the migrating state, NDM may copy such data from R2 2124 to R2 2126 over 2402 using RDF and its link or connection 2402. Additionally, in this migrating state, connection 2108a becomes passive or inactive whereby only the target system 2104 (and not the source system 2102) is accepting host I/Os. Thus, in the migrating state, writes to LUN A may only be accepted over 2504 at target system 2104 (and writes from host 2110a over 2108a to system 2012 are not accepted). In this migrating state as compared to the pass through mode or state, the system 2104 locally commits and stores the write data (where it may be recalled that the write data is not so locally committed and stored on 2104 when in pass through mode). Other processing in the migrating state may be similar to that as described herein for the pass through mode or state.

Figure 7:
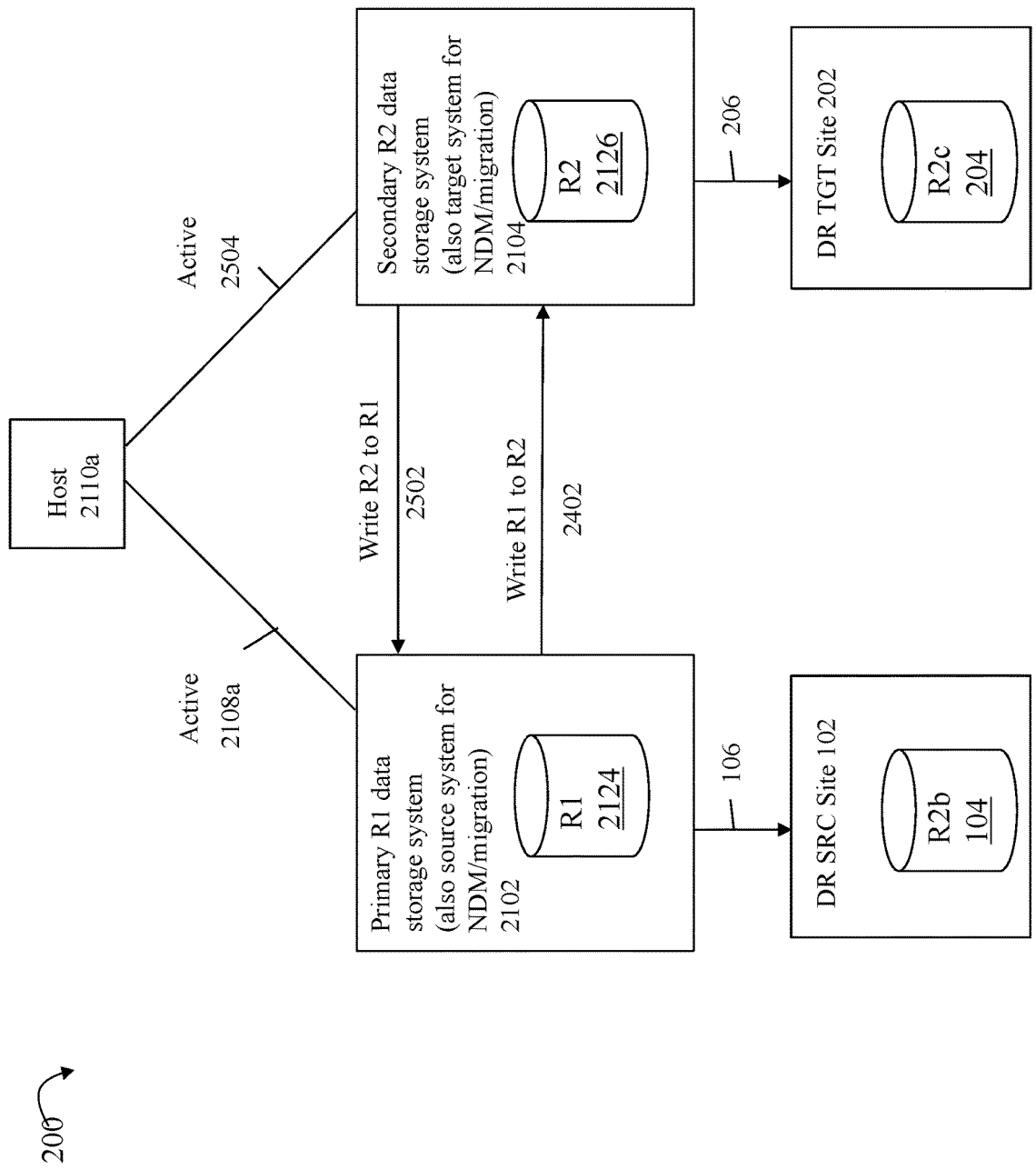

Referring to FIG. 7, shown is another example of components that may be used in an embodiment in accordance with techniques herein. The example 200 includes components configured as described in connection with the example 100 with the following additional components: DR TGT (target) site or system 202, connection or link 206, and device R2C 204. Element 202 denotes a fourth data storage system serving as the DR system or site for the target system 2104. In the example 200, there may be a fourth configured R1-R2 RDF device pair of R2 2126 and R2c 204 configured for synchronous data replication whereby R2c 204 is maintained as a mirror of device 2126 in a synchronous manner. Thus, R2c 204 may also be configured as the same LUN, LUN A, as devices 2124, 2126 and 104. Writes to R2 2126/LUN A are transferred over connection or link 206 to R2c 204. In the example 200, the device 2126 is configured as an R2 device (of the R1 2124-R2 2126 RDF device pair) and also configured as an R1 device (of the third configured R1-R2 RDF device pair where device 2126 is the R1 device of the pair and of device R2c 204 is configured as the R2 device of the pair). The configuration of the example 200 may operate as described below in more detail as well as operate as described herein in connection with pass through mode (e.g., paths 2108a and 2504 are both active but system 2104 does not locally store or commit received write data) as well as the migrating state or mode (e.g., path 2108a is passive or inactive rather than active as denoted in FIG. 7 and system 2104 does store or commit write data of write operations received directly over path 2504).

Consistent with discussion elsewhere herein and with reference to FIG. 7, a third write to LUN A may be sent over path 2108a to system 2102. The write data may be stored in cache on 2102 and marked as WP to be subsequently destaged or written out to physical storage provisioned for R1 2124 at a later point in time. Additionally, the third write may be sent to both data storage systems 2104 and also 102. The third write may be sent by system 2102 over 106 to DR SRC site 102 where the write data is stored in data cache of system 102. Once the third write data is stored in cache of the system 102, the system 102 returns a first acknowledgement regarding completion (successful completion) to system 2102. In a similar manner, the third write may be sent by system 2102 over connection 2402 to system 2104. In turn, the system 2104 may store the third write data in cache of the system 2104 and further transmit the third write (over 206) to system 202. System 202 may then store a copy of the third write data in its data cache (to be later written out to physical storage provisioned for R2c 204). Once the third write data has been stored in the data cache of system 202, system 202 may send a second acknowledgement to system 2104. Once the system 2104 receives the second acknowledgement from system 202 and has stored the third write data to its local data cache, the system 2104 may return a third acknowledgement to system 2102. Once the system 2102 receives both the above-noted first and third acknowledgements, respectively, from systems 102 and 2104, the system 2102 may then return an acknowledgement to the host regarding successful completion of the host's third write operation. In this manner, the additional copies of LUN A data maintained as R2b 104 on DR SRC site 102 and also R2c 204 on DR TGT site 202 may be maintained using synchronous replication techniques as described herein. In the example 200, a first RDF device pair R1 2124-R2 2126 may be configured for synchronous replication mode as described above. Additionally, the second RDF device pair R1 2124-R2b 104 may be configured for synchronous replication mode where devices 2124, 2126 and 104 may also be configured as devices including copies of LUN A data (e.g., 2124, 2126, 104 may be configured as the same logical device LUN A). Yet additionally, devices 2126 and 204 may be configured as the fourth RDF R1-R2 device pair as described above. In connection with this third write, systems 2102, 2104 and 202 may be characterized in one aspect as forming a series of data storage systems in a linear chain where the third write is sent to each data storage system in this chain. The third write may be sent by system 2102 over connection 2402 to system 2104 where the write data is stored in data cache of system 2104. Additionally, the third write may be further cascaded and passed to the next system 202 in the chain. In a manner similar to that as described in connection with the linear chain formed from systems 2104, 2102 and 102 with FIG. 6, the foregoing systems 2102, 2104 and 202 may also form a linear chain where write data is synchronously replicated and cascaded across systems forming the linear chain. A failure regarding the third write may result if there is failure regarding data transmission or acknowledgement for any portion of the chain (e.g., between any 2 systems of the chain or failure to store the write data on any system of the chain).

Consistent with discussion elsewhere herein, a fourth write to LUN A may be sent over path 2504 to system 2104. The fourth write data may be stored in cache on 2104 (whereby the write data is subsequently written out to physical storage provisioned for R2 2126 at a later point in time). Additionally, the fourth write may be sent to data storage systems 2102 and 202, whereby system 2102 may further transmit the fourth write to system 102. In connection with this fourth write, systems 2104, 2102 and 102 may be characterized in one aspect as forming a series of data storage systems in a linear chain as described elsewhere herein (e.g., in connection with the second write with FIG. 6). System 2102 may store the fourth write data in its cache, and send the fourth write to system 102. System 102 may store the fourth write data in its cache and return a first acknowledgement to system 2102. System 2102 may return a second acknowledgement to system 2104 once it receives the first acknowledgement from system 102 and after system 2102 has stored the fourth write data in its data cache. A failure regarding the fourth write may result if there is failure regarding data transmission or acknowledgement for any portion of the chain of systems 2104, 2102, 102 (e.g., between any 2 systems of the chain or failure to store the write data on any system of the chain).

System 202 may receive the fourth write from system 2104, store the fourth write data its data cache, and return a third acknowledgement to system 2104. Once system 2104 has stored the fourth write data in its data cache and additionally receives the foregoing second and third acknowledgements, respectively, from systems 2102 and 202, the system 2104 may return an acknowledgement to the host regarding completion of the fourth write.

Thus, FIG. 7, is an example of a configuration in which both the systems 2102 and 2104 both have configured DR sites, respectively, DR sites 102 and 202; and FIG. 6 is an example of a configuration in which only system 2102 has a configured DR site 102. In a similar manner, techniques herein may be used in connection with a configuration as illustrated in FIG. 8 where only system 2104 has a configured DR site 202.

Figure 8:
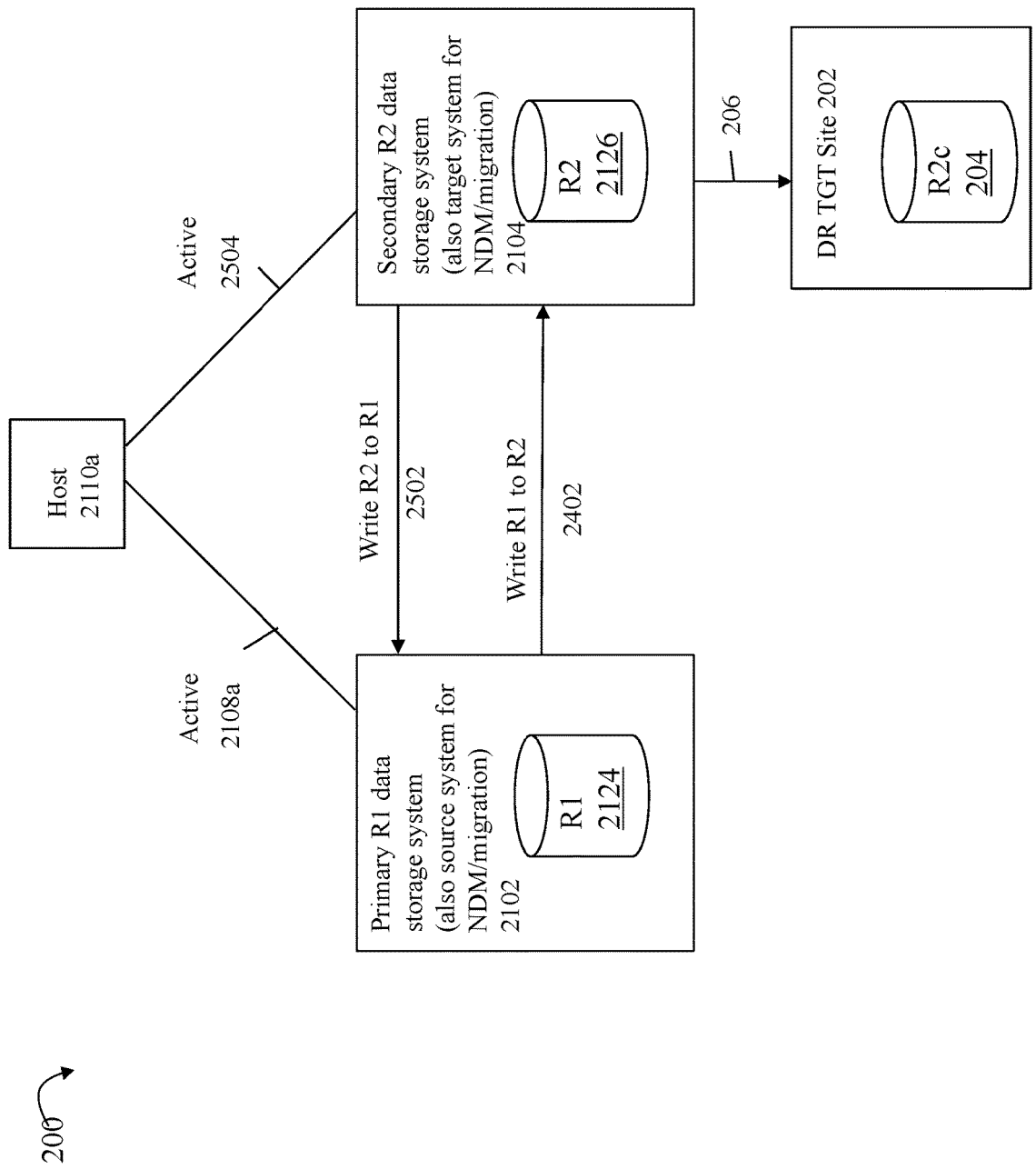

Referring to FIG. 8, a fifth write to LUN A may be sent over path 2108a to system 2102. The write data may be stored in cache on 2102 and marked as WP to be subsequently destaged or written out to physical storage provisioned for R1 2124 at a later point in time. Additionally, the third write may be sent by system 2102 over connection 2402 to system 2104. In turn, the system 2104 may store the fifth write data in cache of the system 2104 and further transmit the fifth write (over 206) to system 202. System 202 may then store a copy of the fifth write data in its data cache (to be later written out to physical storage provisioned for R2c 204). Once the fifth write data has been stored in the data cache of system 202, system 202 may send a first acknowledgement to system 2104. Once the system 2104 receives the first acknowledgement from system 202 and has stored the third write data to its local data cache, the system 2104 may return a second acknowledgement to system 2102. Once the system 2102 receives the second acknowledgement from system 2104, the system 2102 may then return an acknowledgement to the host regarding successful completion of the host's fifth write operation. In this manner, systems 2102, 2104 and 202 from a linear chain such as described elsewhere herein (e.g., in connection with FIG. 7). A failure regarding the fifth write may result if there is failure regarding data transmission or acknowledgement for any portion of the chain of systems 2102, 2104, 202 (e.g., between any 2 systems of the chain or failure to store the write data on any system of the chain).

Referring to FIG. 8, a sixth write to LUN A may be sent over path 2504 to system 2104. The write data may be stored in cache on 2104 and marked as WP to be subsequently destaged or written out to physical storage provisioned for R1 2124 at a later point in time. Additionally, the sixth write may be sent by system 2104 over connection 2502 to system 2102. Subsequently, the system 2102 may store the sixth write data in cache of the system 2102 and return a first acknowledgement to system 2104. The system 2104 may also send the sixth write over connection 206 to system 202. The system 202 may store the sixth write data in cache of the system 202 and return a second acknowledgement to the system 2104. System 2104 may return an acknowledgement regarding completion of the sixth write operation once system 2104 has stored the sixth write data in its cache and also received the foregoing first acknowledgement from system 2102 and second acknowledgement from system 202.

It should generally be noted that in connection with FIG. 8, path 2108a may be active as illustrated, or may alternatively be passive whereby I/Os from host 2110a transmitted to 2102 over 2108a are not accepted (e.g., I/Os sent over 2108a for LUN A are not processed or serviced).

It should also be noted that in connection with FIG. 7, path 2504 may be active and path 2108a may be active as illustrated, or path 2108a may alternatively be passive whereby I/Os from host 2110a transmitted to 2102 over 2108*a* are not accepted (e.g., I/Os sent over 2108*a* for LUN A are not processed or serviced). As a further variation in connection with FIG. 7, path 2108*a* may be active and path 2504 may be passive whereby I/Os from host 2110*a* transmitted to 2104 over 2504 are not accepted (e.g., I/Os sent over 2504 for LUN A are not processed or serviced).

As noted above and in connection with the embodiments described herein, such as illustrated in FIGS. 6, 7 and 8, any of the linear chains of data storage systems described herein in connection with processing a host write operation may be generally expanded to include more than 3 data storage systems whereby completion of the host write operation is returned only upon successful acknowledgment by each system in the chain. Consistent with discussion herein, a system in the chain propagates its acknowledgement (regarding the write) up the chain to another sending system that previously transmitted the write operation to the system. In at least one embodiment as described herein, the foregoing linear chains of data storage systems over which synchronous replication is performed are in accordance with defined RDF device pairs configured for synchronous replication. In such an embodiment, for a defined RDF device pair, one of the devices is configured as the R1 device whereby the write to the R1 device is replicated in a synchronous manner to another device configured as the R2 device of the pair. For the defined RDF device pair, the R1 device and the R2 device are in different data storage systems of the linear chain. Thus, a replication facility such as RDF may perform processing as described herein to facilitate synchronous replication of writes. Such processing may include, for example, transmitting the write between data storage systems in a synchronous manner consistent with configured RDF device pairs. Such processing may also include, for example, sending various acknowledgements regarding write completion and/or transmission between data storage systems of the linear chain.

Figure 9:
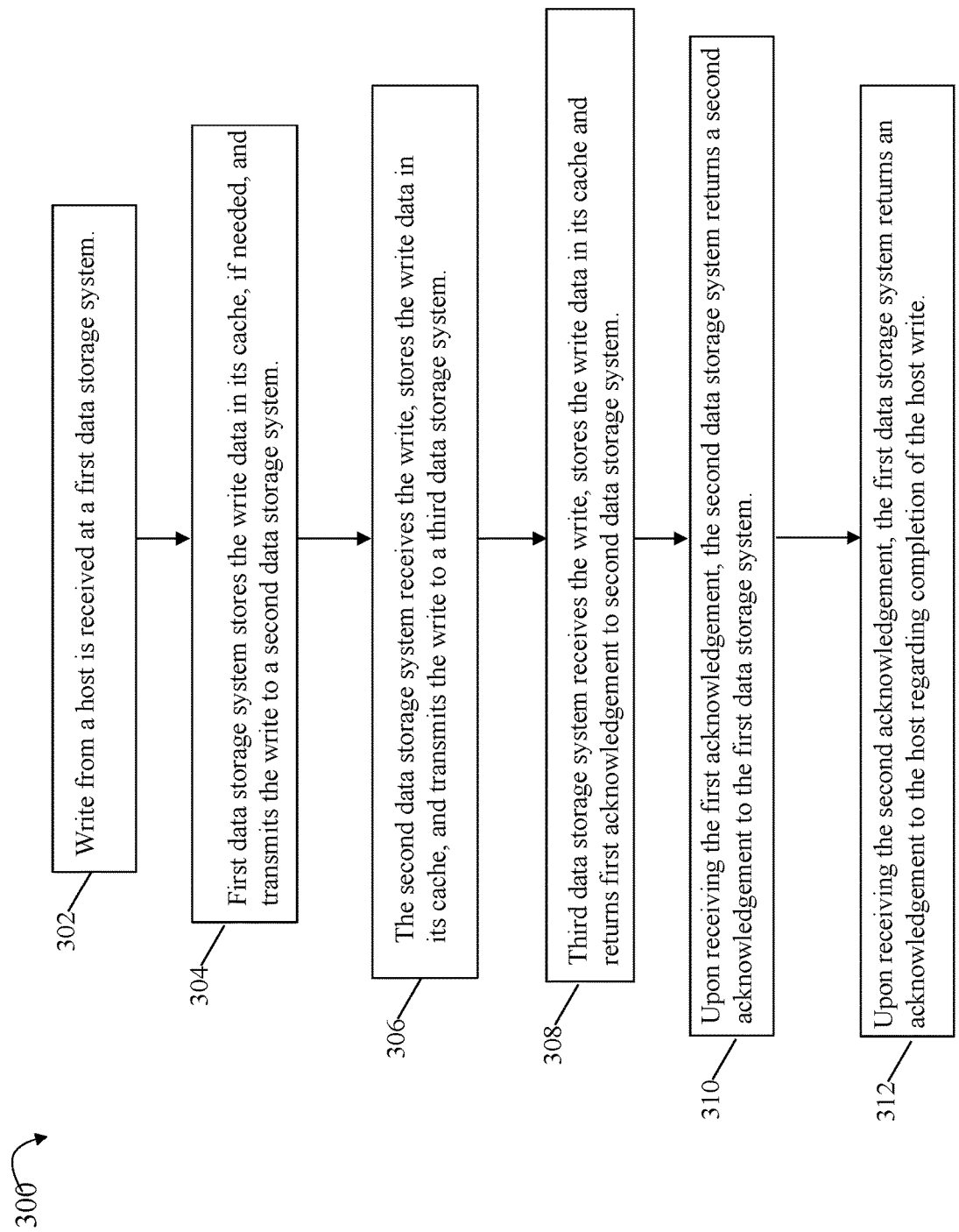
FIGS. 9 and 10 are flowcharts of processing steps that may be performed in an embodiment in accordance with techniques herein.

Referring to FIG. 9, shown is a flowchart of processing steps that may be performed in an embodiment in accordance with techniques herein. The flowchart 300 summarizes processing of a write operation from a host where the write is received at a first data storage system included in a linear chain of data storage systems based on multiple defined RDF device pairs configured for synchronous replication as described herein. The flowchart 300 processing may be performed, for example, in connection with a configuration such as FIG. 6 where there is only a single configured DR site 102. The chain in this example of processing steps of flowchart 300 includes only 3 data storage systems and the first data storage system is not configured with a DR site. The chain, for example, may include systems 2104, 2102 and 102 as described above in connection with FIG. 6 where the write is received by system 2104, the first data storage system. In such a system, there may be an RDF R1-R2 device pair A configured for synchronous replication whereby the R1 device is in the first data storage system 2104 and the R2 device is in the second data storage system 2102 (e.g., device 2126 may be the R1 device and device 2124 may be the R2 device in this RDF device pair A). In such a system there may be another RDF R1-R2 device pair B configured for synchronous replication whereby the R1 device is in the second data storage system 2102 and the R2 device is in the third data storage system 102 (e.g., device 2124 may be the R1 device and device 104 may be the R2 device in this RDF device pair B). The foregoing describes only a single RDF device pair configured between systems 2104 and 2102 where the RDF device pair is used for synchronous replication of writes 2104 to 2102 (e.g., write to 2126 is synchronously replicated to 2124). The foregoing may be sufficient if path 2108*a* is passive and path 2504 is active. However, if path 2108*a* is also active as well as path 2504, then yet another RDF R1-R2 device pair C may be configured for synchronous replication of writes from 2102 to 2104. The RDF R1-R2 device pair C may have device 2124 configured as the R1 device and device 2126 configured as the R2 device.

At step 302, the write is received from the host at the first data storage system 2104. At step 304, the first data storage system 2104 stores the write data in its data cache, if needed, and transmits the write to the second data storage system 2102 of the chain. Transmitting the write to system 2102 from 2104 may be performed, for example, as a result of the processing performed by an RDF facility for the RDF device pair A noted above configured for synchronous replication. It should be noted that depending on the embodiment, the system 2104 may be configured to store or commit the write locally. However, as described herein in connection with the pass through mode, an embodiment may also be configured to operate in a mode (such as pass through mode described herein) where the system 2104 simply passes through writes to the system 2102 whereby system 2104 does not store or commit the write locally.

At step 306, the second data storage system 2102 receives the write, stores the write data in its cache, and transmits the write to the third data storage system 102. Transmitting the write to system 102 from 2102 may be performed, for example, as a result of the processing performed by an RDF facility for the RDF device pair B noted above configured for synchronous replication At step 308, the third data storage system 102 receives the write, stores the write data in its local cache, and returns a first acknowledgement to the second data storage system 2102. At step 310, upon receiving the first acknowledgement, the second system 2102 returns a second acknowledgment to the first system 2104. At step 312, upon receiving the second acknowledgment, the first system 2104 returns an acknowledgement to the host regarding completion of the write received from the host in step 302. In connection with the system configuration described above, the third data storage system may be configured as a DR site of the second data storage system.

Figure 10:
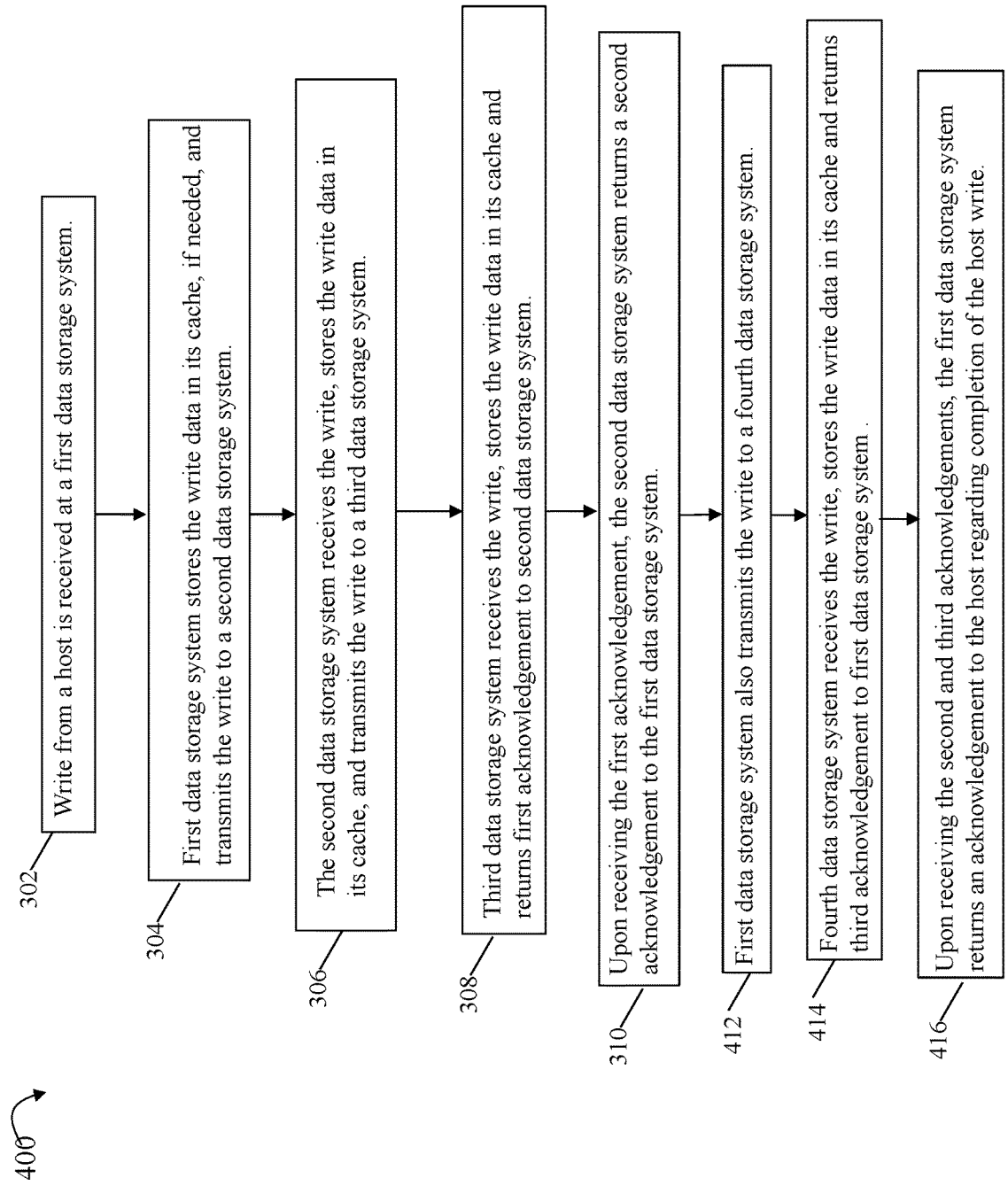

Referring to FIG. 10, shown is a second flowchart of processing steps that may be performed in an embodiment in accordance with techniques herein. As described below, the flowchart 400 processing steps may be performed in an embodiment, for example, such as illustrated in FIG. 7 including two DR sites 102 and 202. The flowchart 400 summarizes processing of a write operation from a host where the write is received at a first data storage system included a linear chain of data storage systems as described herein. The chain in this example processing steps of 400 includes only 3 data storage systems. The chain, for example, may include systems 2104, 2102 and 102 as described above in connection with FIG. 9 where the write is received by system 2104, the first data storage system. In such a system, there may be the RDF R1-R2 device pair X1 configured for synchronous replication whereby the R1 device is in the first data storage system 2104 and the R2 device is in the second data storage system 2102 (e.g., device 2126 may be the R1 device and device 2124 may be the R2 device in this RDF device pair X1). In such a system there may be another RDF R1-R2 device pair X2 configured for synchronous replication whereby the R1 device is in the second data storage system 2102 and the R2 device is in the third data storage system 102 (e.g., device 2124 may be the R1 device and device 104 may be the R2 device in this RDF device pair X2). In connection with the system configuration described above, the third data storage system 102 may be configured as a DR site of the second data storage system 2102. The foregoing describes only a single RDF device pair X1 configured between systems 2104 and 2102 where the RDF device pair is used for synchronous replication of writes 2104 to 2102 (e.g., write to 2126 is synchronously replicated to 2124). The foregoing may be sufficient if path 2108a is passive and path 2504 is active. However, if path 2108a is also active as well as path 2504, then yet another RDF R1-R2 device pair X3 needs to be configured for synchronous replication of writes from 2102 to 2104. The RDF R1-R2 pair X3 may have device 2124 configured as the R1 device and device 2126 configured as the R2 device.

Additionally, as further illustrated in FIG. 7, a fourth data storage system 202 may be configured as the DR site of the first system 2104. In such a case, another RDF R1-R2 device pair X4 may be configured for synchronous replication whereby the R1 device is 2126 and the R2 device is 204. As such, the flowchart 400 includes processing steps that may be performed in an embodiment based on the configuration described above in connection with FIG. 7 with two DR sites 102, 202.

In the flowchart 400, steps 302, 304, 306, 308, and 310 may be as described in connection with flowchart 300. Additionally, flowchart 400 may also include step 412 where the first data storage system, such as 2104, also transmits the write to a fourth data system, such as the system 202. The transmission of the write from the first system 2104 to the fourth system 202 may performed as a result of RDF for the RDF device pair X4 configured for synchronous replication. At step 414, the fourth system 202 receives the write, stores the write data in its cache, and returns a third acknowledgement to the first system 2104. At step 416, upon receiving the second and third acknowledgements, the first system 2104 may return an acknowledgement to the host regarding completion of the host write.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing I/O operations comprising:
    establishing a pass through mode prior to commencing migration for a configuration including a source data storage system and a target data storage system, wherein data of a logical device is migrated by said migration from the source data storage system to the target data storage system, wherein, when configured in the pass through mode, writes to the logical device are sent from a host over a first path to the source data storage system and a second path to the target data storage system, and wherein, when configured in the pass through mode, first writes to the logical device received over the second path from the host at the target data storage system are transmitted from the target data storage system to the source data storage system and the target data storage system does not store first write data of the first writes received at the target data storage system prior to returning acknowledgements regarding completion of the first writes to the host;
    receiving, at a first data storage system from the host while the pass through mode is established, a write operation that writes data to the logical device; and
    performing first processing while the pass through mode is established, said first processing including:
        sending the write operation in a synchronous manner to a plurality of other data storage systems, wherein the first data storage system and the plurality of other data storage systems form a linear chain over which the write operation is transmitted; and
        sending an acknowledgement to the host regarding completion of the write operation only after the first data storage system and each of the plurality of other data storage systems have acknowledged completion of the write operation; and wherein the first processing performed while the pass through mode is established further includes:
    determining whether the first data storage system, that received the write operation from the host, is configured as the target data storage system; and
    responsive to determining the first data storage system, that received the write operation from the host, is configured as the target data storage system, sending said acknowledgement from the first data storage system that received the write operation to the host without storing write data of the write operation on the first data storage system.

2. The method of claim 1, wherein each data storage system of the plurality of other data storage systems acknowledges completion of the write operation to another data storage system of the linear chain that sent the write operation to said each data storage system.

3. The method of claim 1, wherein the plurality of other data storage systems is two data storage systems.

4. The method of claim 1, further comprising:
    sending the write operation from the first data storage system to a second of the plurality of other data storage systems;
    sending the write operation from the second data storage system to a third of the plurality of other data storage systems;
    receiving, at the second data storage system from the third data storage system, an acknowledgment regarding completion of the write operation; and
    responsive to receiving, at the second data storage system from the third data storage system, the acknowledgement regarding completion of the write operation, sending a second acknowledgement from the second data storage system to the first data storage system regarding completion of the write operation.

5. The method of claim 4, further comprising:
    responsive to receiving, at the first data storage system from the second data storage system, the second acknowledgement regarding completion of the write operation, sending the acknowledgement to the host regarding completion of the write operation.

6. The method of claim 5, wherein the write operation writes data to the logical device having its data migrated from the source data storage system to the target data storage system, wherein the first data storage system is the target data storage system, the source data storage system is the second data storage system, and the third data storage system is a disaster recovery site of the source data storage system.

7. The method of claim 6, wherein the first data storage system includes a first storage device and the second data storage system includes a second storage device, wherein the first storage device and the second storage device are configured as the logical device.

8. The method of claim 7, wherein the third data storage system includes a third storage device configured as the logical device.

9. The method of claim 5, wherein the write operation writes data to the logical device having its data migrated from the source data storage system to the target data storage system, wherein the first data storage system is the source data storage system, the target data storage system is the second data storage system, and the third data storage system is a disaster recovery site of the target data storage system.

10. The method of claim 9, wherein the first data storage system includes a first storage device and the second data storage system includes a second storage device, wherein the first storage device and the second storage device are configured as the logical device.

11. The method of claim 10, wherein the third data storage system includes a third storage device configured as the logical device.

12. The method of claim 5, wherein the first data storage system includes a first storage device and the second data storage system includes a second storage device, the first storage device and the second storage device are configured as a same logical device, the logical device, and wherein the write operation writes data to the same logical device, the host is configured when in the pass through mode to write data to the same logical device over a plurality of paths including the first path and the second path.

13. The method of claim 12, wherein data of the same logical device is being migrated from the source data storage system to the target data storage system when the configuration transitions from the pass through mode to a migration mode, and wherein the source data storage system is one of the first data storage system and the second data storage system, and wherein the target data storage system is the other of the first data storage system and the second data storage system.

14. A non-transitory computer readable medium comprising code stored thereon that, when executed, performs a method of processing I/O operations comprising:
    establishing a pass through mode prior to commencing migration for a configuration including a source data storage system and a target data storage system, wherein data of a logical device is migrated by said migration from the source data storage system to the target data storage system, wherein, when configured in the pass through mode, writes to the logical device are sent from a host over a first path to the source data storage system and a second path to the target data storage system, and
    wherein, when configured in the pass through mode, first writes to the logical device received over the second path from the host at the target data storage system are transmitted from the target data storage system to the source data storage system and the target data storage system does not store first write data of the first writes received at the target data storage system prior to returning acknowledgements regarding completion of the first writes to the host;
    receiving, at a first data storage system from the host while the pass through mode is established, a write operation that writes data to the logical device; and
    performing first processing while the pass through mode is established, said first processing including:
    sending the write operation in a synchronous manner to a plurality of other data storage systems, wherein the first data storage system and the plurality of other data storage systems form a linear chain over which the write operation is transmitted; and
    sending an acknowledgement to the host regarding completion of the write operation only after the first data storage system and each of the plurality of other data storage systems have acknowledged completion of the write operation; and wherein the first processing performed while the pass through mode is established further includes:
    determining whether the first data storage system, that received the write operation from the host, is configured as the target data storage system; and
    responsive to determining the first data storage system, that received the write operation from the host, is configured as the target data storage system, sending said acknowledgement from the first data storage system that received the write operation to the host without storing write data of the write operation on the first data storage system.

15. A system comprising:
a processor; and
a memory comprising code stored thereon that, when executed, performs a method of processing I/O operations comprising:
    establishing a pass through mode prior to commencing migration for a configuration including a source data storage system and a target data storage system, wherein data of a logical device is migrated by said migration from the source data storage system to the target data storage system, wherein, when configured in the pass through mode, writes to the logical device are sent from a host over a first path to the source data storage system and a second path to the target data storage system, and wherein, when configured in the pass through mode, first writes to the logical device received over the second path from the host at the target data storage system are transmitted from the target data storage system to the source data storage system and the target data storage system does not store first write data of the first writes received at the target data storage system prior to returning acknowledgements regarding completion of the first writes to the host;
    receiving, at a first data storage system from the host while the pass through mode is established, a write operation that writes data to the logical device; and
    performing first processing while the pass through mode is established, said first processing including:
        sending the write operation in a synchronous manner to a plurality of other data storage systems, wherein the first data storage system and the plurality of other data storage systems form a linear chain over which the write operation is transmitted; and
        sending an acknowledgement to the host regarding completion of the write operation only after the first data storage system and each of the plurality of other data storage systems have acknowledged completion of the write operation; and wherein the first processing performed while the pass through mode is established further includes:

determining whether the first data storage system, that received the write operation from the host, is configured as the target data storage system; and responsive to determining the first data storage system, that received the write operation from the host, is configured as the target data storage system, sending said acknowledgement from the first data storage system that received the write operation to the host without storing write data of the write operation on the first data storage system.

\* \* \* \* \*